Patented Aug. 7, 1945

2,381,511

UNITED STATES PATENT OFFICE 2,381,511

PLASTICIZED CELLULOSE ESTER

Irving E. Muskat, Akron, and Franklin Strain, Norton Center, Ohio, assignors to Pittsburgh Plate Glass Company, Pittsburgh, Pa., a corporation of Pennsylvania No Drawing. Application October 4, 1941, Serial No. 413,645

4 Claims. (Cl. 106—179)

This invention relates to novel resinous compositions. Prior to the present invention it has often been found exceedingly difficult to secure plasticized resinous compositions or dispersions or solutions thereof which are capable of being subjected to the high temperatures which are often required in molding or polymerizing such compositions. Thus, it is often observed that the plasticizer vaporizes to an undesirable degree during polymerization whereby a product having a poor surface is secured. In accordance with the present invention it has been found that certain complex esters derived from a polyhydroxy compound, carbonic acid, and a saturated alcohol, as hereinafter more fully described, are particularly effective as plasticizers for resinous and plastic compositions and that resinous or plastic compositions plasticized with these esters are highly resistant to heat and also to the attack of various chemicals.

The invention is especially directed to the use of carbonate esters of the polyglycols which may be regarded as esters of (a) a polyglycol, preferably an 1,2-alkylene polyglycol, and (b) an acid ester of a saturated alcohol and carbonic acid. Thus, a polyhydroxy ether which contain an ether group between a pair of hydroxy groups such as diethylene glycol, triethylene glycol, tetraethylene glycol, pentaethylene glycol, or the corresponding di-, tri-, tetra-, pentapropylene glycol, or the corresponding polyglycols of butylene glycol, trimethylene glycol, pentamethylene glycol, etc., may be reacted with a monochloroformate of a saturated alcohol such as the monochloroformates of methyl, ethyl, propyl, butyl, amyl, hexyl, lauryl, benzyl, beta-phenyl ethyl, or stearyl alcohols, cyclohexanol, cyclopentanol or the halogen substituted alcohols such as chloromethyl, chlorobenzyl, or of polyhydric alcohols such as ethylene glycol, propylene glycol, diethylene glycol, trimethylene glycol, or other glycol or polyglycols or the corresponding mono ethers or mono esters thereof such as the methyl, ethyl, propyl, butyl, allyl, methallyl, phenyl cellosolve, or similar ether or the mono esters of acetic, propionic, butyric, isobutyric, cinnamic, stearic, oleic, acrylic, methacrylic, or crotonic acids to form esters. Other esters may be prepared by reaction of polyglycols with monohaloformates of other saturated hydroxy compounds such as diesters or diethers of glycerol, methyl glycerol, etc., or from phenols or other hydroxy aromatics such as hydroxy diphenyls, hydroxy naphthalene, etc.

While it is found preferable to utilize the polyesters containing at least two carbonate groups and not more than eight ester linkages in a single chain, the mono esters of the polyglycols are also useful. In such a case the remaining hydroxyl group or groups may be free or may be esterified with acids such as acetic, propionic, acrylic, methacrylic, cinnamic, oleic, or stearic acids, or etherified with methyl, ethyl, butyl, phenyl, oleyl, allyl, methallyl, or similar groups. In addition, hydroxy acids or esters thereof such as lactic acid, methyl lactate, the lactic acid ester of cellosolve derivatives such as phenyl cellosolve lactate, methyl cellosolve lactate, or the corresponding glycolate, ricinoleate, salicylate, or hydroxy butyrate, or other derivatives may be reacted with a polyhaloformate of a polyglycol such as diethylene glycol dichloroformate to form compounds having desirability as solvents and plasticizers. Specific methods for preparation of the esters herein mentioned are described in our copending application for United States Letters Patent Serial No. 385,772, filed March 28, 1941, and Serial No. 413,644, filed October 4, 1941.

Many of the compounds are liquids although in some cases they may be solids. These compounds have been found to be especially effective as placticizers and solvents for resins and plastics such as cellulose derivatives including ethyl cellulose, benzyl cellulose, or methyl cellulose, cellulose hydrate, cellulose nitrate, viscose, or cellulose acetate, or acetobutyrate, vinyl polymers including polymers of methyl methacrylate, ethyl methacrylate, methyl chloracrylate, the corresponding ethyl, propyl, butyl, or other esters of acrylic acid, alpha methyl, alpha ethyl, alpha halo, alpha amino, or other alpha substituted acrylic acid including the allyl, methallyl, oleyl, glycerol, resorcinol, furfuryl, glycol, or other unsaturated or polyhydric alcohol esters and polyesters thereof, or the polymers described in our application for United States Letters Patent Serial No. 361,280, filed October 15, 1940, and Serial No. 403,703, filed July 23, 1941.

Molding and coating compositions may be prepared using these agents. In many cases the carbonate esters herein specified are compatible in equal parts by weight with the above resins. In other cases, smaller proportions of the esters are compatible with the resins. In any case, however, the above compositions possessing high strength and high heat and light stability may be secured by incorporatitn of the carbonate esters herein mentioned in resinous compositions.

The concentration of the esters may be varied considerably. For most purposes 5 to 75 percent of the ester based upon the weight of the resin is found to be suitable for the production of a plasticized composition. Molding compositions may be prepared by milling the plasticizer into the resinous composition between rolls.

The plasticizer may be incorporated in a coating composition by dissolving or dispersing the resin in a suitable solvent such as acetone, chloroform, toluene, ethyl acetate, dioxane, nitroethane, ether, ethylene dichloride, methanol, cellosolve, triacetine, etc., and mixing the carbonate ester therewith.

Pigments such as zinc oxide, titanium dioxide, carbon black, chromium oxide, etc., may be incorporated, if desired. Likewise, other plasticizers such as diamyl naphthalene, "Arochlor 1254," tri-o-cresyl phosphate, diphenyl ether, castor oil, phenyl cellosolve, dibutyl phthalate, etc., may be added to improve the compatibility of the resin with the carbonate ester or otherwise assist the production of a suitable composition. The following compositions are found suitable for molding or coating compositions:

I

| | Parts by weight |
|---|---|
| Polymerized methyl methacrylate | 100 |
| Diethylene glycol bis (methyl carbonate) | 30 |

II

| | Parts by weight |
|---|---|
| Polymerized methyl methacrylate | 100 |
| Diethylene glycol bis (amyl carbonate) | 20 |

III

| | Parts by weight |
|---|---|
| Polymerized vinyl acetate | 100 |
| Diethylene glycol bis (ethyl carbonate) | 20 |

IV

| | Parts by weight |
|---|---|
| Cellulose actate | 100 |
| Diethylene glycol bis (butyl cellosolve carbonate) | 15 |

V

| | Parts by weight |
|---|---|
| Ethyl cellulose | 6 |
| Diethylene glycol bis (n-propyl carbonate) | 1.2 |
| Titanium dioxide | 3 |
| Ethyl alcohol | 20 |
| Toluene | 40 |
| Xylene | 25 |
| Methyl cellosolve acetate | 2 |

VI

| | Parts by weight |
|---|---|
| Polystyrene | 6 |
| Diethylene glycol bis (n-amyl carbonate) | 1.5 |
| Titanium dioxide | 10 |
| Toluene | 40 |
| Xylene | 25 |
| Ethyl alcohol | 20 |
| Methyl cellosolve acetate | 2 |

VII

A mixture of 90 parts of ethylene glycol bis (allylcarbonate) and 10 parts of diethylene glycol bis (amyl carbonate) was heated with 5 percent benzoyl peroxide for 16 hours at 70° C. followed by 4 hours at 100° C. A flexible light colored polymer was obtained. No noticeable vaporization of plasticizer was noted during the polymerization.

While the invention is particularly directed to the use of polyglycol derivatives as plasticizers, other esters of (a) a polyhydroxy compound and (b) an acid ester of carbonic acid and a saturated hydroxy compound may be used in accordance with the present invention. Thus, the esters which may be prepared by reaction of the monochloroformates of the above mentioned saturated hydroxy derivatives with polyhydroxy compounds such as ethylene glycol, propylene glycol, isobutylene glycol, trimethylene glycol, pentamethylene glycol, glycerol, methyl glycerol, pinacol, mannitol, erythritol, glucose, levulose, sucrose, cellulose derivatives such as cellulose monoacetate, cellulose hydrate, or mono ethers of cellulose, polyvinyl alcohol, castor oil, glycol dilactate, glycol diglycollate, hydroxy ethyl lactate, glycol monosalicylate, cyclohexanediol, phthalyl alcohol, aromatic compounds such as resorcinol or hydroquinone, etc., or polyhydroxy ethers such as polyglycerols, etc., preferably other polyhydroxy compounds containing no more than four ester groups between the hydroxy group, may be used. Moreover, the compounds formed by reaction of lactic acid or other hydroxy acid esters such as glycol monoacetate mono lactate, ethyl lactate methyl cellosolve lactate, castor oil, or other hydroxy carboxylic acid ester with a dichloroformate such as ethylene glycol dichloroformate, etc., may be utilized as plasticizers in the manner described. Preferably, the compounds contemplated no more than eight ester linkages in a single chain counting the ester linkages derived from each carbonate group

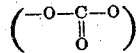

as two.

The preparation of such compounds is described in our application Serial No. 385,772, filed March 28, 1941, previously mentioned.

Although the present invention has been described with reference to certain specific modifications, it is not intended that the details of these modifications shall be regarded as limitations upon the invention except as incorporated in the following claims.

This application is a continuation-in-part of application Serial No. 385,772, filed March 28, 1941.

We claim:

1. A cellulose ester plasticized with an ester of one molecular equivalent of a polyglycol and two molecular equivalents of an acid half-ester of a saturated monohydric alcohol and carbonic acid.

2. A cellulose ester plasticized with a bis (alkyl carbonic acid) ester of a polyglycol.

3. A cellulose ester plasticized with a bis (alkyl carbonic acid) ester of a polyethylene glycol.

4. A cellulose ester plasticized with a bis (alkyl carbonic acid) ester of diethylene glycol.

IRVING E. MUSKAT.
FRANKLIN STRAIN.